(12) United States Patent
Atwell

(10) Patent No.: US 7,041,198 B2
(45) Date of Patent: May 9, 2006

(54) DISTILLATION SYSTEM

(76) Inventor: George Atwell, 891 St. Gabriel Avenue, St. Norbert, Manitoba (CA) R3V 1E9

(*) Notice: Subject to any disclaimer, the term of this patent is extended or adjusted under 35 U.S.C. 154(b) by 711 days.

(21) Appl. No.: 10/114,040

(22) Filed: Apr. 3, 2002

(65) Prior Publication Data

US 2003/0188962 A1 Oct. 9, 2003

(51) Int. Cl.
*B01D 3/42* (2006.01)

(52) U.S. Cl. .............................. 203/2; 203/11; 203/22; 202/176; 202/177; 202/234; 202/205

(58) Field of Classification Search ................ 202/176, 202/177, 234, 205; 203/2, 11, 22, DIG. 1
See application file for complete search history.

(56) References Cited

U.S. PATENT DOCUMENTS

| | | | |
|---|---|---|---|
| 4,078,976 A | 3/1978 | Spears, Jr. | |
| 4,110,174 A | 8/1978 | Carson | |
| 4,204,914 A * | 5/1980 | Diggs | 202/176 |
| 4,211,609 A * | 7/1980 | Diggs | 202/176 |
| 4,235,680 A * | 11/1980 | Diggs | 203/2 |
| 4,285,776 A * | 8/1981 | Atwell | 202/187 |
| 4,302,297 A | 11/1981 | Humiston | |
| 4,329,205 A * | 5/1982 | Tsumura et al. | 202/174 |
| 4,343,683 A * | 8/1982 | Diggs | 203/2 |
| 4,536,257 A | 8/1985 | Atwell | |
| 4,770,748 A | 9/1988 | Cellini et al. | |
| 5,645,693 A * | 7/1997 | Gode | 202/173 |
| 5,932,074 A | 8/1999 | Hoiss | |
| 6,309,513 B1 * | 10/2001 | Sephton | 202/155 |

* cited by examiner

*Primary Examiner*—N. Bhat
(74) *Attorney, Agent, or Firm*—Ryan W. Dupuis; Michael R. Williams; Adrian D. Battison

(57) ABSTRACT

A distillation system is provided having an evaporation conduit and a condensing conduit connected by a transfer system for transferring distillate vapour from the evaporation conduit to the condensing conduit to condense the distillate. The evaporation and condensing conduits operate under vacuum pressure. An intake conduit and a return conduit communicate in an unrestricted manner between a source of solution and the evaporation conduit. A distillate conduit communicates with the condensing conduit for dispensing condensed distillate therefrom. A radiant heat capturing system is provided for capturing and using heat radiated from the distillate conduit to generate power.

17 Claims, 6 Drawing Sheets

US 7,041,198 B2

DISTILLATION SYSTEM

FIELD OF THE INVENTION

The present invention relates to a distillation system for separating a distillate from a solution and more particularly to a desalination system for separating freshwater from saltwater.

BACKGROUND

Desalination systems are one example of distillation systems in which freshwater is separated from salt water as a distillate. Due to receding freshwater resources, the development of desalination systems are important for the production of usable water from saltwater for consumption and agriculture for example. Examples of desalination systems are found in the following U.S. Pat. No. 5,932,074 to Hoiss; U.S. Pat. No. 4,770,748 to Cellini et al; U.S. Pat. No. 4,302,297 to Humiston; U.S. Pat. No. 4,110,174 to Carson and U.S. Pat. No. 4,078,976 to Spears.

One particular desalination system, described in U.S. Pat. No. 4,536,257 provides an evaporation chamber and a condensing chamber which are connected by a transfer pump for pumping water vapour from the evaporation chamber to the condensing chamber. Evaporation and condensation occur by maintaining pressure in the chambers substantially at the vapour pressure of water at ambient temperatures. A float valve controls release of concentrated salt water from the evaporation chamber. In this arrangement, scale is know to form on the float valve and corresponding valve seat which may affect operation of the system. Furthermore, entrained air in the saltwater coming into the evaporation chamber can reduce the effectiveness of the system, forcing the vacuum pump to do extra work to remove the air which is released in the evaporation chamber. Operation of the vacuum pump consumes considerable power for continued operation.

SUMMARY

According to a first aspect of the present invention there is provided a distillation system comprising:

an evaporation conduit;

an intake conduit and a return conduit in communication between a source of solution and the evaporation conduit, communication of the intake conduit and the return conduit with the evaporation conduit being unrestricted;

a condensing conduit;

a distillate conduit in communication with the condensing conduit;

a transfer system connecting the evaporation conduit and the condensing conduit for transferring distillate vapour from the evaporation conduit to the condensing conduit to condense the distillate vapour in the condensing conduit; and a vacuum pump connected to at least one of the evaporation and condensing conduits for evacuating air from the evaporation and condensing conduits.

The use of unrestricted intake and return conduits requires minimal maintenance as there are no moving parts upon which solute scale can form which might otherwise interfere with proper operation of the system. A variable control system may be provided for adjusting the rate of distillate vapour transfer of the transfer system in place of valves on the intake or return conduits as in the prior art.

There may be provided a boiler arranged to exchange heat with the distillate conduit for heating the boiler. The addition of a boiler enables useful power to be produced from heat released from the distillate conduit for operating the system with minimal energy being wasted. In particular, a radiant heat capturing system may be provided for capturing heat radiating from the distillate conduit.

In one embodiment, the radiant heat capturing system comprises a series of lenses for focusing the heat radiating from the distillate conduit to a focal point.

Alternatively, the radiant heat capturing system may comprise a series of reflective surfaces for reflecting the heat radiating from the distillate conduit to a focal point.

The radiant heat capturing system may include a heat sink surrounding the distillate conduit for capturing heat from the distillate conduit by conduction. The radiant heat capturing system in this instance being arranged to capture heat radiating from the heat sink. The distillate conduit may comprise an array of spaced apart tubes at the heat sink with the heat sink spanning between and around the tubes.

The intake conduit preferably comprises an upright column extending between the source of solution and the evaporation conduit. There may be provided a heat exchanger in communication between the distillate conduit and the intake conduit adjacent the source of solution at the base of the upright column.

The distillate conduit preferably comprises an upright column and a heat exchanger conduit at the heat exchanger, the heat exchanger conduit having a greater cross-sectional area than the upright column.

Temperature of solution at the intake conduit, when the solution is saltwater, may be well below 100 degrees Fahrenheit, in the order of 85 degrees Fahrenheit at a point of evaporation. When condensed, the resulting distillate can reach over 200 degrees Fahrenheit.

The intake conduit preferably includes at least one de-aerator connected in series therewith, said at least one de-aerator comprising a chamber of increased cross sectional area in relation to the intake conduit extending upwardly from the intake conduit in communication with a vacuum pump above a level of solution in the chamber. The de-aerator removes entrained air before the solution reaches the evaporator. This avoids a build up of atmosphere and an increased workload for the vacuum pump of the transfer system.

The return conduit preferably comprises an upright column having an open top end in unrestricted communication with the evaporation conduit in which the intake conduit is connected to the return conduit adjacent the open top end below an operating level of solution in the return conduit.

The distillate conduit in one embodiment terminates at a free end elevated well above the source of solution. This is useful for operating the distillation system as a pump for raising distillate to a substantially elevated level.

According to a further aspect of the present invention there is provided a method of separating a distillate from a solution comprising:

providing a source of solution;

providing an evaporation conduit;

providing an intake conduit and a return conduit in unrestricted communication between the source of solution and the evaporation conduit;

providing a condensing conduit;

providing a distillate conduit in communication with the condensing conduit;

providing a vacuum pump;

evacuating air from the evaporation and condensing conduits by operating the vacuum pump; and condensing distillate vapour in the condensing conduit by transferring the distillate vapour from the evaporation conduit to the condensing conduit.

The method may include adjusting a rate of distillation and an operating temperature of the distillate conduit by varying a rate of vapour transfer from the evaporation conduit to the condensing conduit.

The method preferably includes capturing heat radiating from the distillate conduit.

Distillate vapour may initially be condensed at a reduced rate of distillation upon start up for a prescribed period of time until formation of denser solution in the evaporation conduit causes the denser solution to flow away from evaporation conduit through the return conduit.

The method may further include evaporating and condensing water in the evaporation conduit and in the condensing conduit respectively at temperatures generally below 100 degrees Fahrenheit, in the order of 85 degrees Fahrenheit.

BRIEF DESCRIPTION OF THE DRAWINGS

In the accompanying drawings, which illustrate exemplary embodiments of the present invention.

DETAILED DESCRIPTION

Figure 1:
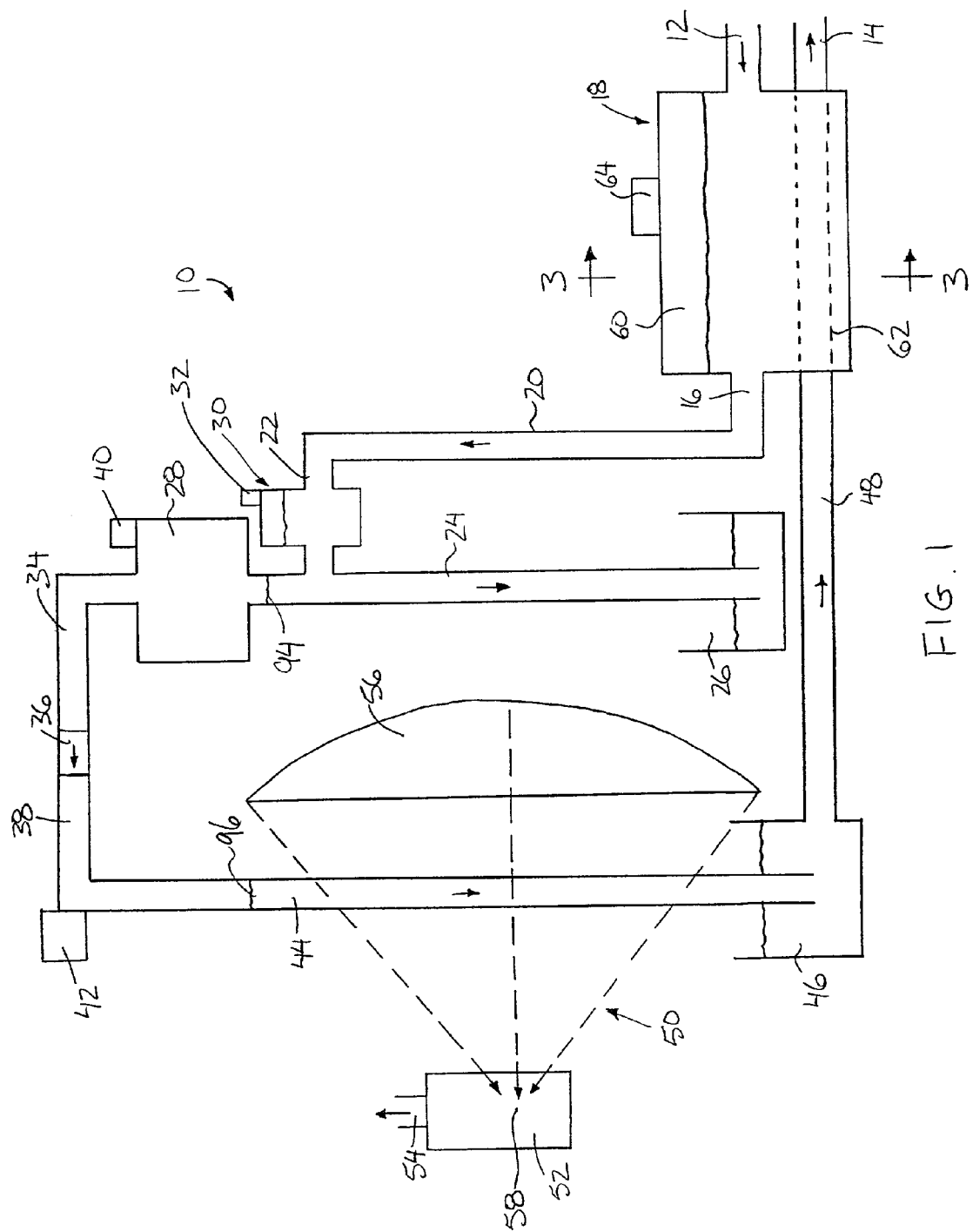
FIG. 1 is a schematic of the distillation system.
Figure 2:
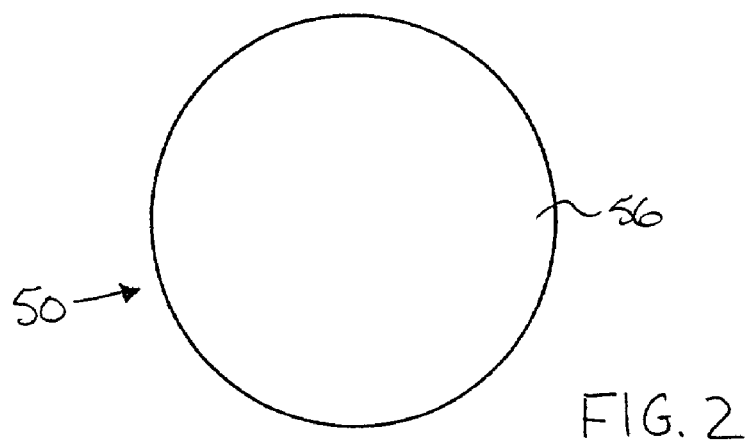
FIG. 2 is a front elevational view of the heat capturing system of the embodiment of FIG. 1.
Figure 3:
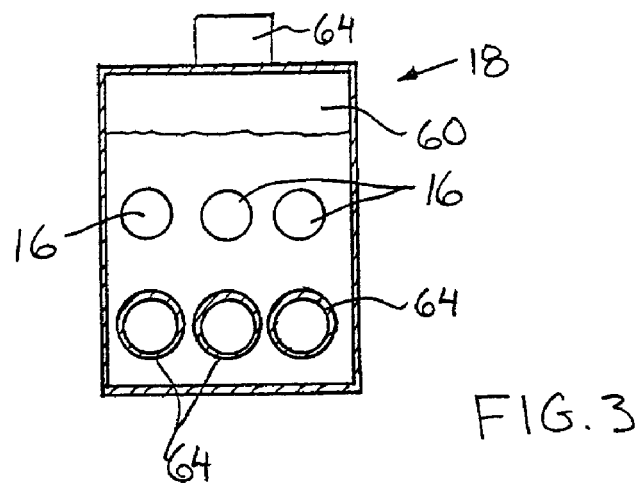
FIG. 3 is a sectional view along the line 3—3 of the heat exchanger of FIG. 1.
Figure 4:
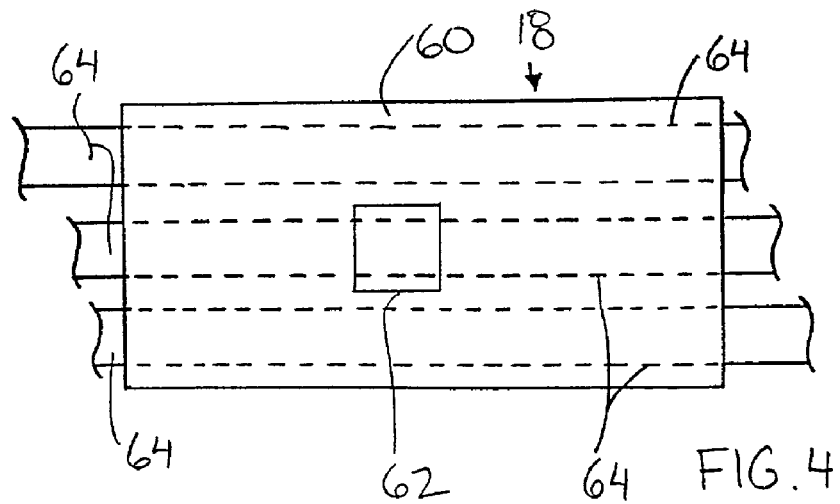
FIG. 4 is a top plan view of the heat exchanger of FIG. 1.

Referring to the accompanying drawings, there is illustrated a distillation system generally indicated by reference numeral 10. The system is particularly useful for desalinating sea water or some other suitable solution source 12 for producing fresh water or some other distillate at a distillate outlet 14 of the system. In alternative arrangements, the system may be used to concentrate a solution by disposing of removed distillate. The system is also arranged to produce heat for useable power.

Solution is drawn into the system from the source 12 through a suitable inlet conduit 16 which extends generally horizontally through a heat exchanger 18 before communication with the base of an intake conduit 20. The intake conduit 20 is an upright column which includes a horizontal portion 22 at a top end thereof which connects the intake conduit 20 to a return conduit 24. The return conduit 24 similarly comprises an upright column for containing fluid therein which is open at a bottom end for communication with a return sump 26 at atmospheric pressure and which is in unrestricted communication at a top end with an evaporation chamber 28.

The horizontal portion 22 of the intake conduit 20 is connected between the top end of the upright column of the intake conduit and the upright column of the return conduit adjacent the top end thereof spaced slightly below the unrestricted open top end of the return conduit. A de-aerator 30 is coupled in series with the horizontal portion 22 of the intake conduit 20 for removing gas dissolved within fluid passing through the intake conduit. The de-aerator 30 generally comprises an enlarged chamber extending upwardly beyond a periphery of the intake conduit. The chamber of the de-aerator is sealed with respect to the intake conduit and permits a vacuum to be maintained therein so that gas dissolved within the fluid in the intake conduit is drawn into a vacuum space located in an upper portion of the chamber of the de-aerator. A suitable vacuum pump 32 is provided in communication with a top end of the chamber of the de-aerator for maintaining suitable vacuum pressures within the de-aerator.

The open unrestricted top end of the return conduit 24 communicates with the evaporation chamber 28 which is considerably enlarged in cross sectional area as compared to the return conduit for slowing the passage of fluid therethrough. An evaporation conduit 34 is coupled to a top end of the evaporation chamber 28 and extends generally horizontally to a transfer pump 36 coupled at an inlet to the evaporation conduit 34 and at an outlet to a condensing conduit 38 which similarly extends substantially horizontally. A vacuum pump 40 communicates with the evaporation chamber to maintain a desirable vacuum pressure within the evaporation chamber and evaporation conduit. The enlarged cross sectional area of the evaporation chamber is useful for ensuring that minimal fluid droplets are carried up into the evaporation conduit by rising vapours from the unrestricted top end of the return conduit.

The condensing conduit 38 includes a vacuum pump 42 in communication therewith for maintaining a desired vacuum pressure therein. The condensing conduit 38 communicates with a distillate conduit 44 in the form of an upright column in which distillate condenses from the condensing conduit 38 at a top end thereof. A base of the distillate conduit 44 is in open communication with a distillate sump 46 which is open to atmospheric pressure. Distillate from the sump 46 is then drawn through an outlet conduit 48 which passes through the heat exchanger 18 for exchanging heat with the inlet conduit 16. The outlet conduit 48 terminates at the distillate outlet 14 of the system.

A heat capturing system 50 is provided for capturing heat released from the distillate conduit 44 and using the heat in a boiler 52 to produce useable power at an outlet 54 of the boiler. The heat capturing system 50 may comprise various designs of heat exchanging devices and radiant heat capturing devices as will be described later herein with regard to the various embodiments.

Turning now to the embodiment of FIGS. 1 through 4, various components of the system will now be described in further detail. In this embodiment, the heat capturing system 50 comprises a concave mirror 56 which extends substantially a full length of the distillate conduit 44, which contains distillate therein. The mirror 56 is concave about a central axis which is positioned so that the mirror stands upright along side the distillate conduit 44, with the central axis extending diametrically across the distillate conduit. The boiler 52 is located opposite the mirror 56 at a focal point 58 of the mirror. In this arrangement, radiant heat which is released from the distillate conduit 44, is reflected onto the mirror 56 and subsequently onto the focal point 58 of the mirror, for heating the boiler 52 to produce steam for useable power at the outlet 54 of the boiler. In further arrangements, the mirror 56 may comprise a plurality of reflective surfaces oriented in various directions, each for focusing radiant heat radiating from the distillate conduit 44 onto the boiler 52.

Referring again to FIGS. 1 through 4, the heat exchanger 18 of the first embodiment generally comprises an enlarged chamber 60 through which the outlet conduit 50 is arranged to pass through in a series of horizontal and parallel outlet tubes 62, spaced from one another and the walls of the chamber 60, adjacent a bottom side of the chamber. The chamber 60 is arranged to communicate in series with the inlet conduit 16 such that fluid from the inlet conduit 16 enters the chamber 60 and surrounds the outlet tubes 62 before again exiting the chamber 60 for communication with the intake conduit 20. The chamber 60 extends upwardly past the horizontal level of the inlet conduit 16 before defining a vacuum space in a top portion thereof above the level of the inlet conduit. A vacuum pressure is maintained within the vacuum space in the upper portion of the chamber 60 by a suitable vacuum pump 64. When using a heat exchanger of this nature, ideally both the distillate sump 46 and the return sump 26 are located at substantially the same level as the outlet conduit 48 and the inlet conduit 16.

Figure 5:
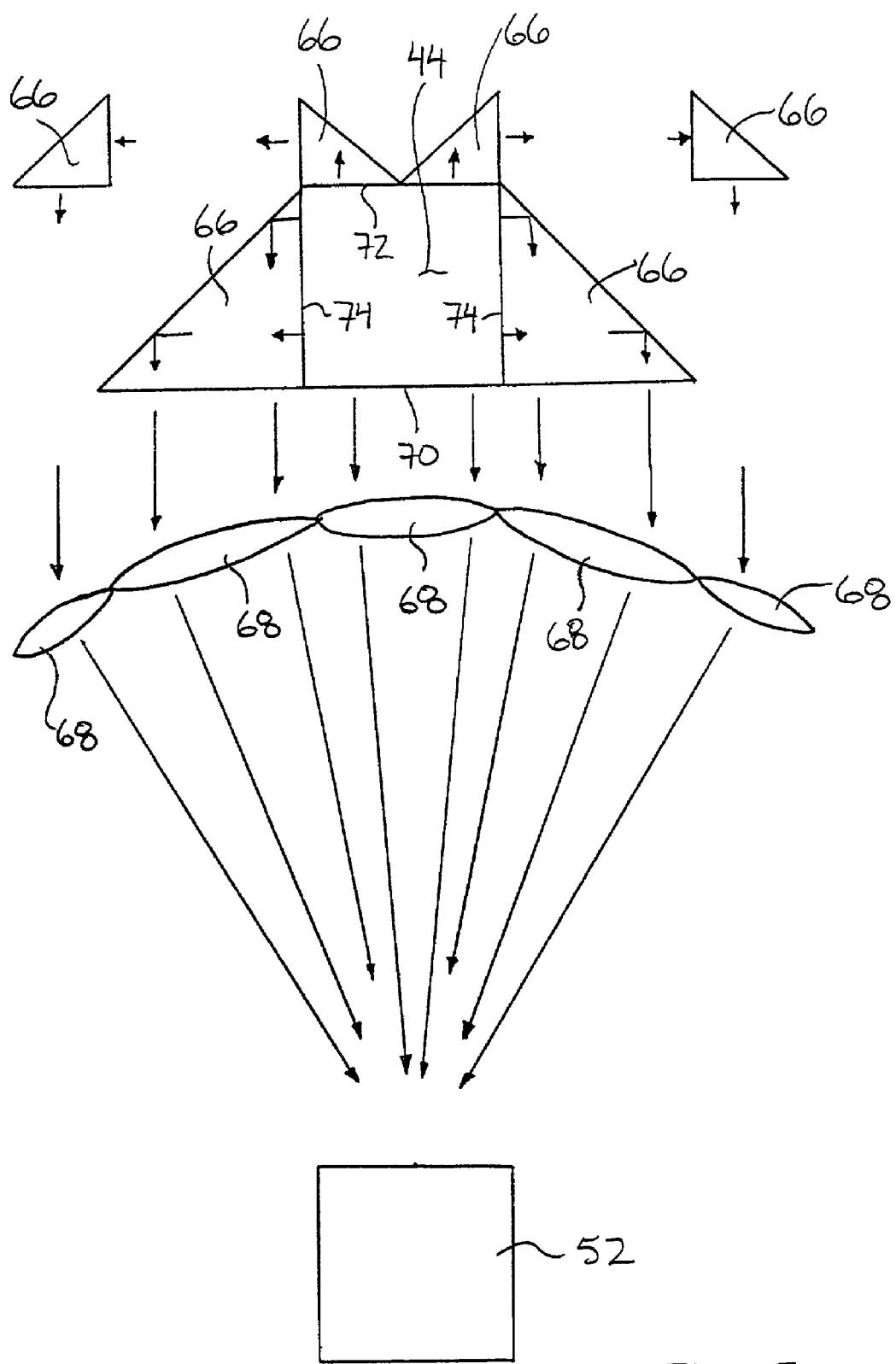
FIG. 5 is a schematic view of an alternative embodiment of the heat capturing system of the distillation system.

Turning now to the embodiment of FIG. 5, an alternate heat capturing system 50 is illustrated for communicating heat between the distillate conduit 44 and the boiler 52. In this arrangement a plurality of prisms 66 and convex lens 68 are provided for reflecting radiant heat from the distillate conduit to the boiler 52. In the illustrated arrangement, heat radiated from a front side 70 of the distillate conduit 44, facing the boiler 52, does not require re-direction but merely requires focusing by a respective one of the lenses 68 which is oriented to focus the radiating heat onto the boiler.

Heat radiated from the back side 72 opposite the boiler is reflected laterally outwardly by a pair of prisms 66, facing opposite one another, directly adjacent the back side, for re-directing radiating heat onto auxiliary prisms spaced laterally outwardly from the distillate conduit, which in turn re-directs the radiating heat onto lenses 68, which are focused on the boiler. Heat radiating laterally outwardly from the intermediate sides 74 of the distillate conduit 44 require redirection by respective prisms only once towards the direction of the boiler 52 at which point the radiating heat is again focused onto the boiler by respective lenses 68.

Figure 6:
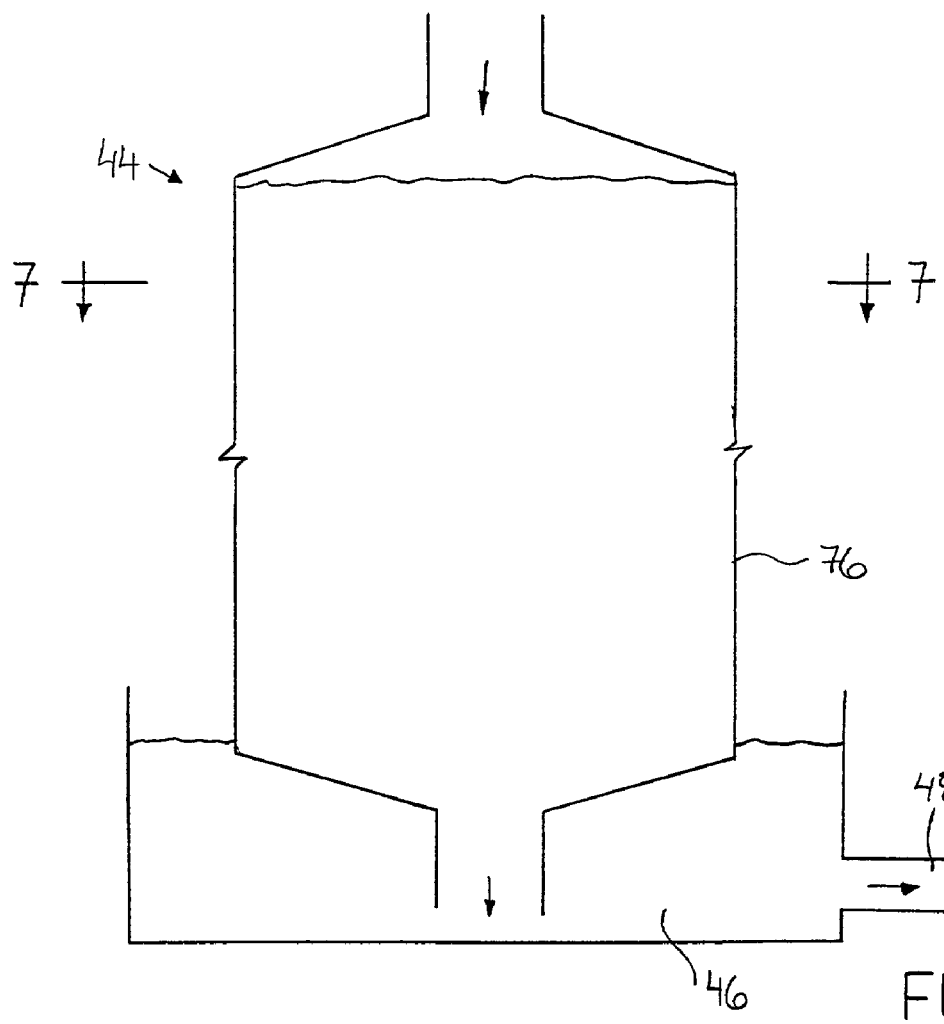
FIG. 6 is a side elevational view of an alternative embodiment of the distillate conduit of the distillation system.
Figure 7:
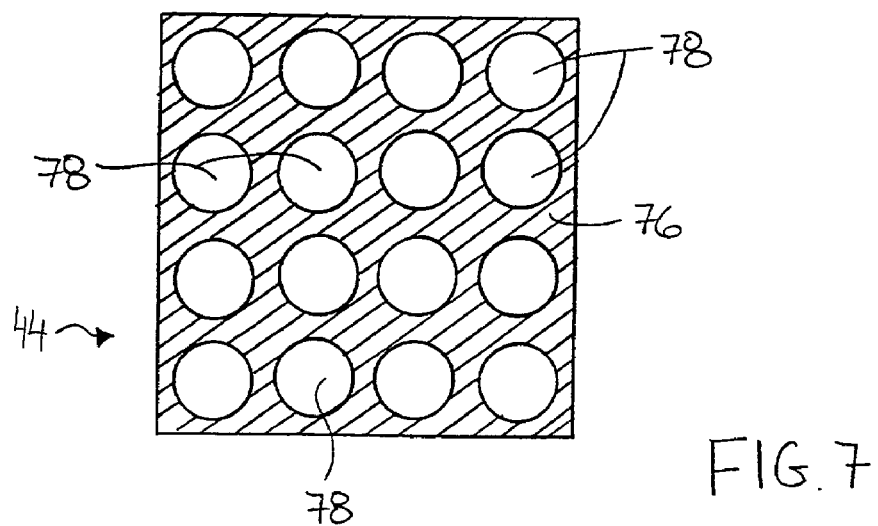
FIG. 7 is a sectional view along the line 7—7 of FIG. 6.

Turning now to FIGS. 6 and 7, an alternate arrangement of the distillate conduit 44 is illustrated for use with the heat capturing system 50 of either FIGS. 1 or 5. In this arrangement the distillate conduit 44 has an enlarged cross sectional area from a base in communication with the distillate sump 46 to a top end in communication with the condensing conduit 38. In a rectangular configuration as shown in the figures, the conduit generally comprises a block in the form of a heat sink 76 in which the fluid of the distillate conduit 44 passes through a plurality of tubes 78.

The tubes 78 are vertically oriented, being parallel and spaced apart from one another through the heat sink 76, each in communication at a top end with a tapered section which communicates with the condensing conduit 38 and in communication with a similar tapering section at a bottom end communicating with the distillate sump 46. The use of a plurality of tubes extending through a heat sink increases the area of the distillate conduit 44 in communication with fluid passing therethrough for conducting more heat away from the fluid which is then radiated outwardly from the outer sides of the distillate conduit 44 to then be captured by the heat capturing system 50 as described above.

Figure 8:
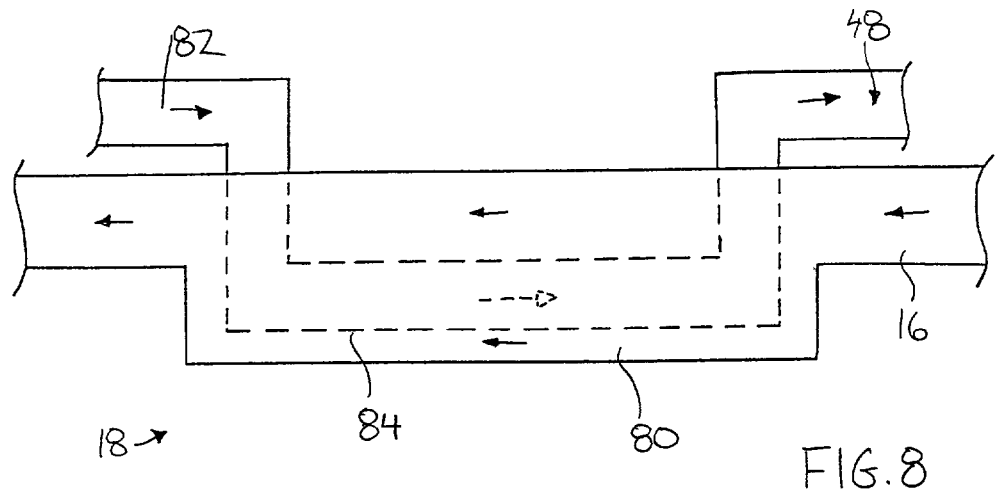
FIG. 8 is a side elevational view of a further embodiment of a heat exchanger for use with the distillation system.
Figure 9:
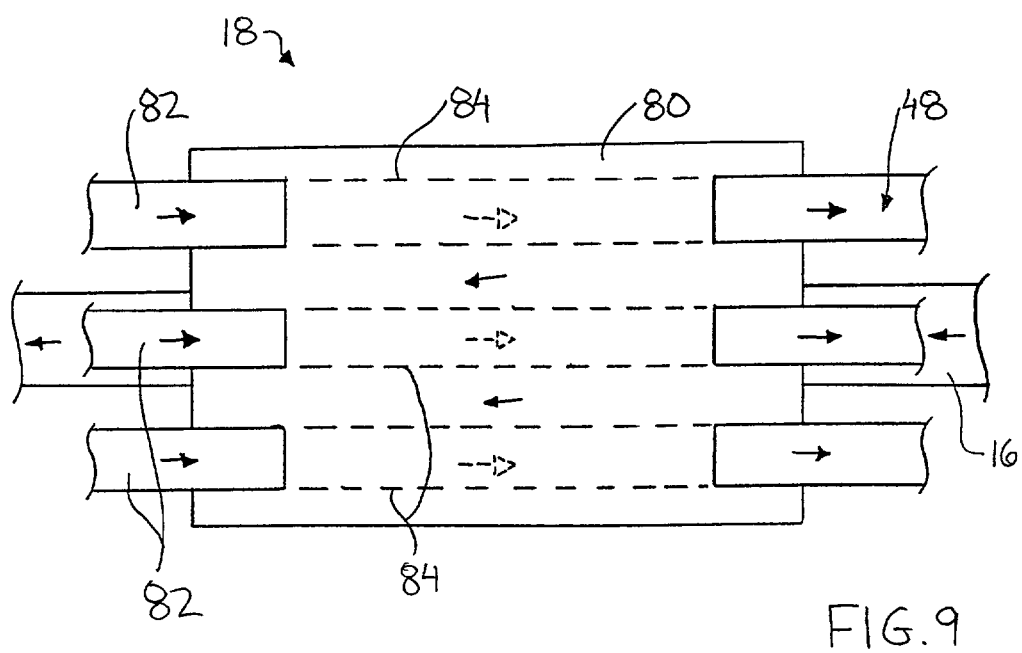
FIG. 9 is a top plan view of the heat exchanger of FIG. 8.

Turning now to FIGS. 8 and 9, a further embodiment of the heat exchanger 18 is illustrated. In this arrangement, a chamber 80 is again provided which is coupled in series with the inlet conduit 16 to permit fluid from the inlet conduit flowing into the chamber 80 circling thereabout and then again exiting the chamber by continuing along the inlet conduit 16. The chamber 80 is arranged to extend downwardly below a level of the inlet conduit 16. The outlet conduit 48 in this instance comprises a series of tubes 82 which are oriented parallel to one another to extend longitudinally through the heat exchanger in a counterflow arrangement with the inlet conduit 16 as in the previous embodiment of the heat exchanger.

Each of the tubes 82 includes an inlet portion and an outlet portion, both being positioned to extend generally horizontally above the inlet conduit 16. A main portion 84 of each of the tubes 82 is generally U-shaped extending first downwardly from a respective inlet section then longitudinally across the chamber 80 and finally upwardly to the outlet section at an opposite end of the heat exchanger. The tubes 82 are sealed with respect to the outlet conduit 48 while the chamber 80 is sealed with respect to the inlet conduit 16 in a manner so that fluid from the inlet conduit and outlet conduit do not mix as in the previous embodiment.

Figure 10:
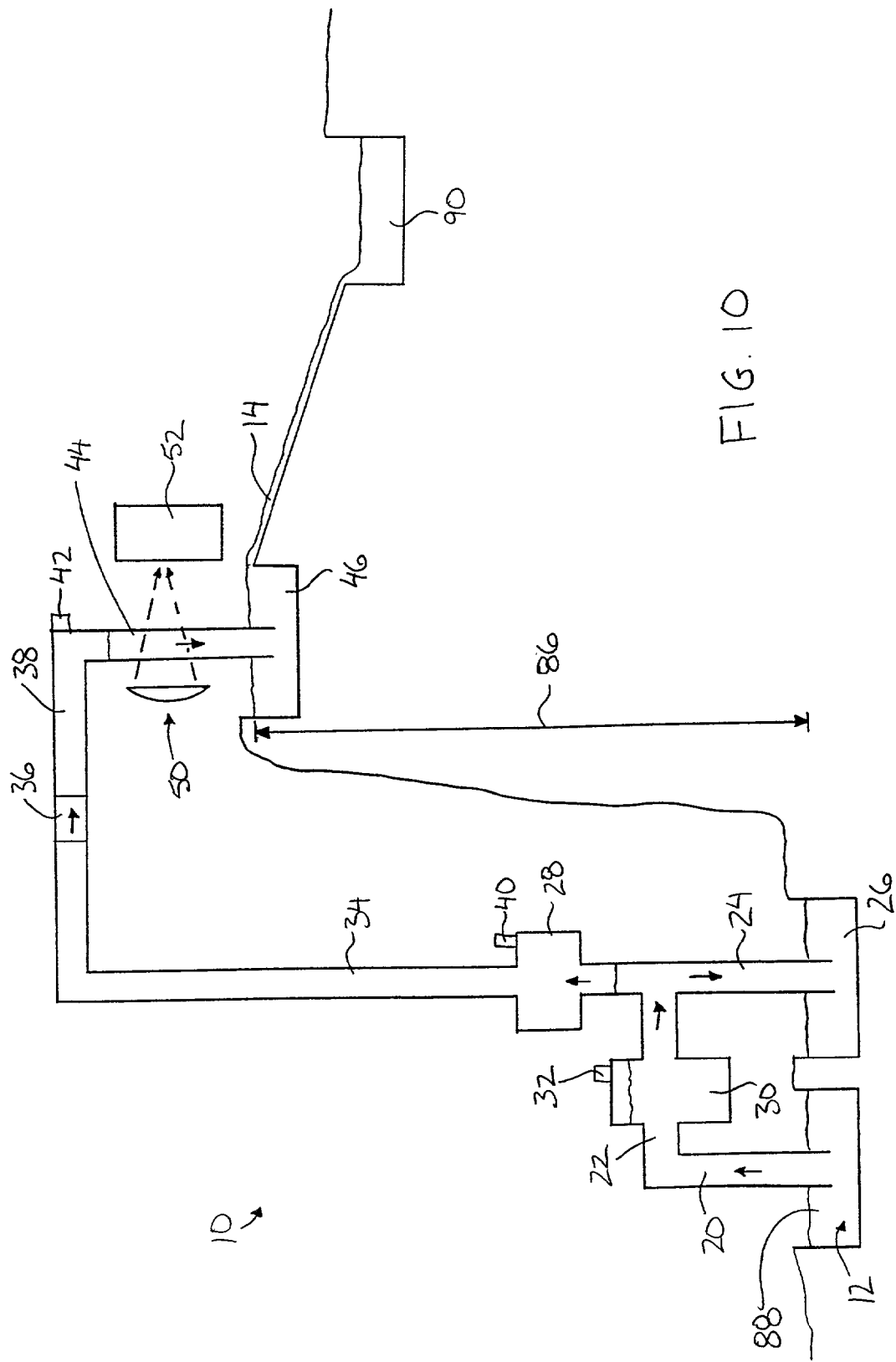
FIG. 10 is a schematic view of an alternative embodiment of the distillation system.

Turning now to a further embodiment of the distillation system illustrated in FIG. 10, the system may be used for elevating water from the solution source to the distillate outlet as the water is distilled. The elevation difference 86 is illustrated as being the distance from the surface of source solution in a source sump 88 in communication with the inlet conduit 16 and the level of distillate in the distillate sump 46. Both the source sump 88 and the distillate sump 46, as well as the return sump 26, are exposed to atmospheric pressure. In this arrangement the intake conduit 20 and return conduit 24 are similarly arranged in communication with one another and the evaporation chamber 28 with the evaporation chamber 28 being located at a level near to the solution source 12. The evaporation conduit 34 in this instance extends upwardly from the evaporation conduit a distance which is substantially equal to the elevation difference 86 before extending horizontally to communicate with the transfer pump 36 as described in the previous embodiment. Vapour transferred from the evaporation conduit to the condensing conduit 38 by the transfer pump is similarly condensed in a distillate conduit 44 from which useable power may be derived using a heat capturing system 50 in communication with a boiler 52 as described previously. As illustrated FIG. 10, overflow from the distillate sump 46 flows downwardly into a collection tank 90 for storing distillate which has been distilled by the system 10 and pumped upwardly a considerable elevation.

Operation of the distillation system begins by first adjusting the fluid levels in the return sump 26 to cover the base of the return conduit 24, in the distillate sump 46 to cover the base of the distillate conduit 44 and at the source 12 to enclose the base of the intake conduit 20. The vacuum pumps 40 and 42 at the evaporation conduit and condensation conduit respectively are operated to empty the closed system of atmosphere. This causes the fluid level in the return conduit 24 to rise in the order of thirty-two feet to the level indicated at 94 which is positioned above a point of communication with the intake conduit 20 but below the unrestricted open communication at the top end with the evaporation chamber 28. Accordingly water level in the distillate conduit 44 rises to level 96 which is slightly higher than the level 94 in the return conduit. Meanwhile the intake conduit 20 is substantially filled with water which rises up to the point of communication of the intake conduit with the return conduit and beyond.

The transfer pump 36, which may comprise a blower for vacuum pump, is then operated at an initially slow speed. The vacuum pump 64 on the heat exchanger 18 is arranged to operate automatically in response to variations in pressure in the chamber 60 so as to maintain the atmospheric pressure in the chamber at approximately 13 pounds per square inch (psi) to allow some entrained air to be removed from the intake fluid passing through the heat exchanger along the inlet conduit 16.

The vacuum pump 32 of the de-aerator 30 is also arranged to operate automatically in response to atmospheric pressure within the de-aerator chamber to keep atmospheric pressure at approximately 0.5 psi. Further downstream the pump 40 on the evaporation chamber 28 is operated to maintain pressure in the order of 0.46 psi which is slightly below pressure within the de-aerator 30. The vacuum pump 42 in communication with the condensing conduit is similarly operated to maintain atmospheric pressure at approximately 0.46 psi to be equal with pressure within the evaporation conduit. Continued operation of the transfer pump 36 will pump distillate vapour from the evaporation conduit to the condensing conduit to cause condensation due to excess vapour pressure in the condensing conduit at which point the condensing distillate forming in the distillate conduit 44 produces a continuous flow of distillate which exits the distillate sump 46 through the outlet conduit 48. Heat from the distillate in the outlet conduit passes through respective outlet tubes 62 in the heat exchanger for preheating the source of solution at a point before the solution rises up into the intake conduit 20 beyond a surface level of the source of solution.

Considerable heat is produced at the distillate conduit 44 as the distillate vapour condenses which is radiated outwardly from the distillate conduit. The mirror 56 of the heat capturing system 50 reflects the radiant heat given off by the distillate conduit to a focal point of the mirror at the boiler from which steam is taken off for work at the outlet of the boiler. The speed of the transfer pump 36 is increased to a point of maximum operation in which evaporation of fluid from the intake and return conduits is continuously condensed in the distillate conduit in dynamic equilibrium. The transfer pump 36 is initially started slowly and is increased in speed until the temperature the solution rising up the intake conduit 20 is approximately 20° F. warmer than the source 12 entering the heat exchanger assuming that the intake of source solution is approximately 57° F. This warming occurs due to the exiting distillate in the outlet conduit 48 which warms the incoming feed solution in the heat exchanger 18.

In operation, as the distillate evaporates at the open outlet of the return conduit 24, the solution becomes denser and more concentrated and begins to flow downwardly into the return sump 26. Vacuum pressure in the evaporation chamber thus continually draws more solution in through the intake conduit 20 to maintain the level substantially at the level indicated 94. The cross sectional area of the evaporation chamber 28 being substantially larger than the cross sectional area of the intake or return conduits leading to it, greatly reduces the flow rate of the vapour through the evaporation chamber to the condensation conduit and thus allows droplets of solution or distillate carried by the vapour sufficient time to either evaporate within the evaporation chamber or fall back down into the return conduit.

The use of the heat exchanger 18 to raise the temperature of the inlet water, reduces the quantity of intake feed water needed. This enables the process of water purification to be carried on with a wide range of intake water temperatures, but the lower the intake water temperature, the larger will the heat exchanger need to be to allow greater time for heat exchange and the less heat will be available to be siphoned off for work at the boiler using the heat capturing system 50.

When used for desalination, the heights of water in the conduits and salinity of the water is determined as follows. Assuming freshwater at 62.25 pounds per cubic foot, the height in the freshwater conduit is calculated to be $(14.7+144)/62.25=34$ feet. Assuming salt content of the incoming salt water is 3.5%, the height in the intake conduit is calculated to be $(14.7\times144)/(62.25\times1.07)=31.78$ feet. Assuming salt content of 3.755% in the return conduit, the height is calculated to be $(14.7\times144)/(62.25\times1.08)=31.49$ feet.

When the saline water intake is at 57° F. at the source 12 with the saline water in the intake conduit 20 at 77° F. in operation and given that the blowdown of saline in the return conduit 24 is at 32° F., every pound of blowdown has given up approximately 45 btu. Thus 1000/45 would equal 22.2 lbs. of blowdown that would allow for 1 lb. of distillate. A combined 23.2 lbs. of flowthrough is thus required to yield 1 lb of freshwater in this example.

A drop of 45° F. in the water temperature causes a height decrease in the 31.78 foot blowdown column having a one foot square cross sectional area of 2 inches when using a co-efficient of expansion of water of 0.00021, determined as follows: $(45/1.8)\times(0.00021/1)\times(31.78/1)=0.167$ feet=2 inches. With 3.5% salt in the intake water, each pound of blowdown would have an increase in salinity of $3.5/13.7=0.255\%$. Each pound of blowdown would thus have a combined salt content of approximately $(3.5+0.255)=3.755\%$. This is reflected in a column height reduction of $(31.78-31.49)=0.29$ feet=3.48 inches.

With all other atmosphere removed and a vapour pressure of 0.46 psi, the transfer pump 36 that moves 43,400 cubic feet of vapour per minute would reduce the height of the evaporating column or return conduit 24 having a one foot diameter by $1/\{[(1\times1)/4]\times(22/7)\}=1/0.7857=1.27$ feet=15.24 inches.

The total height reduction in the evaporation column or return conduit 24 is thus equal to the combination of the two inches due to the drop in temperature, the drop of 3.48 inches due to the increase of salinity and a drop of 15.24 inches due to evaporation for a total reduction of 20.72 inches. This reduction forces replacement water to be drawn up the intake column 20 and keeps the process continuous. The evaporated water is passed to the distillate conduit 44. This quantity of water vapour moved in one minute is one cubic foot weighing approximately 62.25 lbs. This equates 8,971 gallons a day.

In order to determine the energy produced by the distillation system, the main blower is first considered which must work against the vapour pressure of freshwater at 77° F. and 0.46 psi to transfer vapour from the salt water intake side to the freshwater condensing side. To pump 43,400 cubic feet of vapour across one foot in one minute, the pump must do work in the order of $(43,400\times0.46)=19,964$ ft.lb=19,964/33000 hp=$(19,964/33000)\times(746/1000)\times(1/60)$ kWh=0.0075 kWh. Thus it is determined that 6.25 gallons (gal) is produced by 0.0075 kWh and it can be further determined that 1000 gal requires $(1000/6.25)\times(0.0075/1)$ kWh=1.2 kilo Watt hours (kWh).

The power potential is determined by considering the heat which reaches the boiler 52. As the distillate descends in the distillate conduit 44, starting at 77° F. at the top, which is the same as the source water in the intake conduit 20 from which it came, because of the progressively smaller space it must occupy as the weight of the water on each descending cubic foot is increased, the molecules interact ever more closely and much energy that was latent, example energy of molecular rotation, at the top of the conduit becomes kinetic energy and appears as increased temperature until at the bottom of the conduit 34 feet therebelow, the temperature is at 212° F., which is the temperature at which the water would boil at 14.7 psi, into which pressure it now enters. This is an adiabatic effect.

The average temperature of the distillate conduit 44 from 77° F. to 212° F. would be 144.5° F. The height of fluid 96 in the distillate conduit 44 is 34 feet with a diameter of the conduit being 1 foot. Assuming an ambient temperature of 85° F., the difference in temperature between the ambient temperature and the average of the distillate conduit 44 is approximately 59.5° F. The amount of heat exuded by the distillate conduit 44 is thus determined as follows, assuming water transmits 4.36 btu per square foot per degree C difference per minute, 1 btu=778 ft.lb, 1 hp=33,000 ftlb/min and 1 hp=746 Watts:

$$(34/1) \times (59.5/1) \times (1 \times 22/7) \times (4.36/1.8) \times (778/33,000) \times (746/1000) = 271 \text{ Watts.}$$

This heat would be projected by the mirror or mirrors onto the boiler to produce power. Given that the distillation system produces 271 watts in one minute it can be determined that 142,438 kilowatt hours per year could be produced. Thus the power potential is not inconsiderable.

The transfer of heat by use of mirrors is described by Max Planck in the reference "The Theory of Heat Radiation" by Dover Publications, New York, 1959, which is incorporated herein by reference. When mirrors and lenses are used, heat waves act like light waves so that a concave mirror reflects the heat that strikes it onto the focal point of the mirror. A prism however re-directs the light or heat that strikes it at right angles to the line of impact when reflected into and out of the adjacent right angle surfaces of the prism. Furthermore a convex lens concentrates the parallel lines of light or heat rays in the form of radiant heat that strike the lens on one side, onto the focal point of the lens on the opposite side.

Turning now to the heat exchanger, the distillate pipes flowing through the heat exchanger could be larger in cross sectional area than at the distillate column 44 to allow the passage of hot water through the heat exchanger slowly enough to allow adequate heat exchange.

With reference to the arrangement of prisms and lens in the embodiment of FIG. 5, the heat capturing system could be used more efficiently if the distillate column 44 comprised a series of four inch diameter pipes as illustrated in FIGS. 6 and 7 which extend parallel and spaced apart from one another through an aluminium block heat sink with at least one inch of aluminium spanning between and around the tubes. The result would be an aluminium block to which prisms can conveniently be fit.

When considering a distillate column 44 as illustrated in FIG. 1, the area of its cross section is calculated to be 12×12×22/(4×7) which equals 113.14 square inches. Replacing this arrangement with four inch diameter tubes fixed in an aluminium block as described above whose combined cross sectional area is at least equal to this would be advantageous. A four inch diameter tube has a cross sectional area of approximately 12.57 square inches and nine or sixteen such tubes would be required in a square configuration as illustrated. As shown in FIG. 7, a pattern is illustrated of four inch diameter tubes with one inch spacing therebetween that amply fills the requirement. As aluminium transmits heat 340 times as fast as water, compared with the rate at which water transmits heat, the rate of aluminium approaches being instantaneous. In a column of twelve inches in diameter, the average water particle is three inches from the skin of the tube whereas in a column of four inches in diameter, the average water particle is one inch from the skin of the pipe. Thus the extraction of heat would be much greater for a given residence time of distillate in the pipes. The amount of heat extracted from the distillate can be further multiplied by replacing aluminium with copper which in turn transmit heat twice as fast as aluminium does, and/or by multiplying the number of such pipes in the block which would increase the residence time of the distillate therein.

As pipes are made smaller in diameter, the speed of flow is decreased by the increased friction with the sides, thus a somewhat greater aggregate area of cross section would be needed to transmit a given amount of distillate. The heat of evaporation enters the distillate at the top of its column as latent heat and is increasingly converted to sensible heat as it descends the column under increasing pressure, until, at the bottom of the column, under pressure equivalent to its ambient atmospheric pressure, its temperature approaches the boiling point of water at that pressure which is 212° F. This is again an adiabatic action.

Turning now to the embodiment of FIG. 10, the principles of the present invention can be used for pumping water across great elevations 86 in mountainous regions. In this arrangement, the intake conduit 20 and the return conduit 24 include respective sumps which are positioned at the lower level at the origin of the source 12, while the distillate conduit 44 is positioned with its sump at the raised elevation where the water is needed. The water may then be distributed from the raised elevation by gravity or other suitable means. If the operation of the system is simply the transport of water from a limited source to an upper level, then the heat generated from the distillate conduit 44 must be recycled to the cold blowdown leaving the column or return conduit 24 so that the temperature of the source pool is substantially maintained and the process can continue with its heat supply to the intake conduit 20 being substantially maintained.

In the present invention the evaporation chamber and evaporation conduit communicates with the intake conduit 20 and return conduit 24 in an unrestricted manner. The use of valve members in a warm salt solution would gather salt deposits which would render the valve components a poor fit with the respective components upon which the valve members would sit, thus removing its usefulness. Adequate quantities of warm water are assured by starting the main vapour transfer pump 36 slowing at start up for a prescribed period of time after which the speed is increases as the flow of water increase speed to increase the removal of vapour.

The location of the heat exchanger before inlet conduit 16 connects to the upright intake conduit 20, increases temperature in the solution or saline feed to the intake conduit 20 which reduces the needed volume of flow through and reduces thus the size of the intake facilities needed.

The use of a heat capturing system 50 in communication with the distillate conduit 44 is particularly useful to allow energy to be harvested to be put to economic use for heating or power generation. When used in the embodiment of FIG. 10, the system further allows the economical elevation of water from a lower elevation to a raised elevation as illustrated. Most importantly, the modest height and size of the system lends it to replication in groups such that individual units could be shut down for servicing without major interruption of water and power production.

The current dramatic increase in the need for freshwater and for energy are a concern for many nations. The need for renewable energy sources is a pressing concern in world wide communities. The source of this water is the sea and the source of energy is ultimately the sun. These sources are in effect renewable. The reforestation or regeneration of vast areas of earth that the distillation system would make possible would fix once more much atmospheric carbon in vegetation and reduce global warming and the grave threat of coastal flooding in very many areas. Since the water needed can be produced daily to meet daily needs, it obviates the need for storage dams to hold several years supply of water.

This system would not deplete the water table but would provide water to wash salts that have been drawn to the surface by evaporation to lower levels and so improve the productivity of large areas of depleted soils. This system of distillation operates at a relatively low temperature which radically reduces the speed of scale formation on surfaces in contact with salt water. This reduces the frequency of shut downs for de-scaling and this further reduces the cost of operation. This system would allow the inexpensive replenishment of severely depleted water tables or aquifers.

In a further example of the distillation system 10, the system may be used for concentrating fruit juices without subjecting the juices to great heat. The intake and return conduits may be arranged to recycle the juice therethrough while distillate in the form of water vapour is continuously removed for disposal so that the juice becomes more and more concentrated.

When used in a potato chip plant for example, starch water resulting from the processing of potato chips may be similarly recycled between the intake and return conduits of the system to concentrate the starch in solution for easier recovery of the starch. Furthermore, the disposal water is in the form of clean distillate.

In a similar use, the system may be used in a meat packing plant to recover the fat normally sent into the sewer systems with disposal water. When using the distillation system 10, the solution is again circulated through the intake and return conduits to recover the fat in solution as the solution becomes more concentrated while the disposal water comprises clean distillate. This arrangement would reduce the fat being disposed of in sewers which would otherwise normally cost the meat packing plants additional taxes or fines.

In other examples it is desirable to collect the distillate as in a car wash where dirty soapy water may be recycled in the intake and return conduits to salvage some clean distillate water for reuse. In the treatment of sewage, clean distillate water may similarly be extracted by recycling the waste in the intake and return conduits so that the waste may become more concentrated for better disposal.

In yet further arrangements of the present invention, the distillation system may be used for cooling by recycling the distillate conduit back to the intake sump. As evaporation takes place in the evaporation conduit, cooled water is returned through the return conduit for use in air conditioning or industrial cooling. In the distillate conduit, the distillate concentrates the heat from the cooling water in the intake for increasing heat loss rates to the surrounding environment as is desired in a cooling arrangement.

Where disposal of cooling water is desired, the distillate and return conduits may be mixed and disposed of together after the distillate conduit undergoes cooling so that the overall temperature of the exiting distillate and return conduit mixture is considerably less than the temperature of the fluid in the intake conduit. This arrangement is particularly ideal for industrial settings where restrictions apply that cooling water be returned to surrounding water sources at ambient temperatures.

While various embodiments of the present invention have been described in the foregoing, it is to be understood that other embodiments are possible within the scope of the invention. The invention is to be considered limited solely by the scope of the appended claims.

The invention claimed is:

1. A distillation system comprising:
an evaporation conduit;
an intake conduit in communication between a source of solution and the evaporation conduit at the top end of the intake conduit, the intake conduit comprising an upright column in which communication of the intake conduit with the evaporation conduit is unrestricted at the top end of the intake conduit;
a return conduit in communication between the evaporation conduit at a top end of the return conduit and a return sump, the return conduit comprising an upright column in which communication of the return conduit with the evaporation conduit is unrestricted at the top end of the return conduit;
a condensing conduit;
a variable controlled transfer system connecting the evaporation conduit and the condensing conduit and which is arranged to transfer distillate vapour from the evaporation conduit to the condensing conduit to condense the distillate vapour in the condensing conduit, the variable controlled transfer system being operable through a range of vapour transfer rates;
a distillate conduit in communication with the condensing conduit which is arranged to collect condensed distillate therein; and
a vacuum pump connected to at least one of the evaporation and condensing conduits for evacuating air from the evaporation and condensing conduits.

2. The system according to claim 1 wherein there is provided a boiler arranged to exchange heat with the distillate conduit for heating the boiler.

3. A distillation system comprising:
an evaporation conduit;
an intake conduit in communication between a source of solution and the evaporation conduit at the top end of the intake conduit;
a return conduit in communication between the evaporation conduit at a top end of the return conduit and a return sump;
a condensing conduit;
a transfer system connecting the evaporation conduit and the condensing conduit and which is arranged to transfer distillate vapour from the evaporation conduit to the condensing conduit to condense the distillate vapour in the condensing conduit;
a distillate conduit in communication with the condensing conduit which is arranged to collect condensed distillate therein;
a vacuum pump connected to at least one of the evaporation and condensing conduits for evacuating air from the evaporation and condensing conduits;

a power generating device which produces usable power from heat received therein; and a radiant heat capturing system which is arranged to capture radiant heat which is radiating from the distillate conduit and transfer the radiant heat to the power generating device.

4. The system according to claim 3 wherein the radiant heat capturing system comprises a series of lenses for focusing the heat radiating from the distillate conduit to a focal point.

5. The system according to claim 3 wherein the radiant heat capturing system comprises a series of reflective surfaces for reflecting the heat radiating from the distillate conduit to a focal point.

6. The system according to claim 3 wherein the radiant heat capturing system includes a heat sink surrounding the distillate conduit for capturing heat from the distillate conduit by conduction, the radiant heat capturing system being arranged to capture heat radiating from the heat sink.

7. The system according to claim 6 wherein the distillate conduit comprises an array of spaced apart tubes at the heat sink, the heat sink spanning between and around the tubes.

8. The system according to claim 3 wherein the power generating device comprises a boiler arranged to be heated by the radiant heat capturing system.

9. The system according to claim 1 wherein there is provided a heat exchanger in communication between the distillate conduit and the intake conduit adjacent the source of solution at the base of the upright column.

10. The system according to claim 9 wherein the distillate conduit comprises an upright column and a heat exchanger conduit at the heat exchanger, the heat exchanger conduit having a greater cross-sectional area than the upright column of the distillate conduit.

11. The system according to claim 1 wherein the intake conduit includes at least one de-aerator connected in series therewith, said at least one de-aerator comprising a chamber of increased cross sectional area in relation to the intake conduit extending upwardly from the intake conduit in communication with a vacuum pump.

12. The system according to claim 1 wherein the intake conduit is connected to the return conduit adjacent the open top end below an operating level of solution in the return conduit.

13. The system according to claim 1 wherein the distillate conduit terminates at a free end elevated well above the source of solution.

14. A method of separating a distillate from a solution comprising;

providing a source of solution;

providing an evaporation conduit;

providing an intake conduit comprising an upright column in unrestricted communication between the evaporation conduit at a top end of the intake conduit and the source of solution:

providing a return conduit comprising an upright column in unrestricted communication between the evaporation conduit at a top end of the return conduit and a return sump:

providing a condensing conduit;

providing a distillate conduit comprising an upright column in communication with the condensing conduit;

providing a transfer pump communicating between the evaporation conduit and the condensing conduit;

providing a vacuum pump;

evacuating air from the evaporation and condensing conduits by operating the vacuum pump;

condensing distillate vapour in the condensing conduit by transferring the distillate vapour from the evaporation conduit to the condensing conduit using the transfer pump at a reduced rate of distillation upon start up for a prescribed period of time until formation of a denser solution in the evaporation conduit causes denser solution to flow away form the evaporation conduit through the return conduit and subsequently transferring the distillate vapour from the evaporation conduit to the condensing conduit at an elevated rate of distillation which is greater than the reduced rate of distillation; and collecting the distillate in the distillate conduit.

15. The method according to claim 14 including adjusting a rate of distillation and an operating temperature of the distillate conduit by varying a rate of vapour transfer from the evaporation conduit to the condensing conduit.

16. The method according to claim 14 including capturing heat radiating from the distillate conduit.

17. The method according to claim 14 including evaporating and condensing distillate in the evaporation conduit and in the condensing conduit respectively at temperatures generally below 100 degrees Fahrenheit.

* * * * *